3,258,367
MAGNESIUM PRIMARY BATTERY HAVING AQUEOUS CARBOXYLIC ACID SALT-INORGANIC PERCHLORATE SALT ELECTROLYTE
John L. Robinson, Freeland, Mich., assignor to The Dow Chemical Company, Midland, Mich., a corporation of Delaware
No Drawing. Filed May 20, 1963, Ser. No. 281,787
3 Claims. (Cl. 136—100)

This invention relates to an improved electrolyte for use in magnesium primary cells and more particularly is concerned with an aqueous electrolyte of a mixed inorganic perchlorate salt-carboxylic acid salt for use in such cells operating at low drains.

Normally, the anode efficiency of an operating magnesium primary cell decreases with decreasing drain, i.e. increasing load resistance. With the recent surge in and continuing growth of transistorized circuits, which operate with a very light drain, the need for long-lived magnesium primary cells having good anode efficiencies at such drains has become apparent.

A copending application, "Organic Electrolyte for Magnesium Primary Cells," Serial No. 281,788 filed May 20, 1963, discloses a novel organic electrolyte for primary cells which unexpectedly results in high anode efficiency and operating potential at normal drains, i.e. at discharge rates which result in a capacity of up to about 150 hours. Similarly, it has been found that an alkali metal or alkaline earth metal perchlorate electrolyte also provides satisfactory cell performance at such drains. However, at low drains (transistor circuits, e.g.) it has been found that the anode efficiency drops off to a marked degree with both of these electrolyte systems.

It is a principal object of the present invention to provide an aqueous electrolyte for use with magnesium primary cells which gives high anode efficiencies with low drains.

It is a further object of the present invention to provide a novel mixed electrolyte for primary magnesium cells which gives anode efficiencies at low drains which are markedly increased over the individual electrolyte components alone or what could be predicted from an additive effect of the individual components taken together.

It is another object of the present invention to provide an electrolyte for magnesium primary cells operating at low drains having a good working potential.

It is also an object of the present invention to provide an electrolyte for use in a magnesium anode containing primary cell operating at low drains, as in transistor circuits, wherein undesirable corrosion product build-up adjacent the anode and detrimental gassing is minimized over that obtained with the conventional inorganic halide electrolytes normally employed in such cells.

These and other objects and advantages readily will become apparent from the detailed description presented hereinafter.

In accordance with the present invention, high efficiencies and working potentials at low current drains, i.e. with magnesium cells having a discharge rate which results in a capacity markedly greater than 150 hours, are realized for magnesium primary cells employing an aqueous solution of an admixture of (1) an alkali metal or alkaline earth metal salt of certain aliphatic carboxylic or aromatic carboxylic acids and (2) an alkali metal or alkaline earth metal perchlorate as electrolyte. The term "alkali metal" as used herein is meant to include lithium, sodium, potassium, rubidium and cesium and the term "alkaline earth metal" as used herein is meant to include magnesium, calcium, strontium and barium.

The present novel electrolyte contains a carboxylate anion/perchlorate anion ratio, based on ion normality, of from aobut 0.1 to about 7. Preferably this ratio is from 0.3 to about 3 and desirably is about 1. With magnesium primary cells, ordinarily the aqueous electrolyte concentration is from about 0.5 to about 5 normal based on the total carboxylate and perchlorate anions present therein. Preferably the electrolyte concentration ranges from about 1 to about 4 normal with respect to the sum of these anions. For a specific primary cell construction, generally the present novel electrolyte is employed in about the same concentration as the inorganic halide electrolyte normally employed therein. Further, with a dry-type cell, chromates or other traditional inhibitors can be used in conjunction with the present organic electrolytes to extend shelf life (i.e. open circuit corrosion control) of the cell.

The electrolyte of this invention is used in a conventional manner in a magnesium primary cell as this electrolyte is adapted to any primary cell construction employing a magnesium anode or anodes.

In general, the aliphatic carboxylic acid salts which preferably are employed as the organic component of the present novel electrolyte for magnesium primary cells contain from 1 to about 5 carbon atoms in the carbon chain. Further, these salt forming acids are either saturated or unsaturated and straight or branched chain. Saturated aliphatic acids which are either mono- or polycarboxylated are suitable for use in the present invention provided there is at least one methylene or methyl radical or group present for each carboxy group (—COOH) in the parent acid. The terms "methyl group" or "methyl radical" and "methylene group" or "methylene radical" as used herein means (—CH$_3$) and

respectively as well as substituted groups wherein one or more of the H atoms have been replaced by another group. To illustrate, the salts of malonic acid and of hydroxy substituted acids such as citric acid, glycolic acid, tartaric acid and malic acid, for example, are suitable for use as electrolytes with magnesium cells. Additionally, salts of unsaturated aliphatic carboxylic acids having at least one carboxy group for each

group also can be employed. However, substituent groups which are strong polarizers such as halo, nitro, phenolic, etc., cannot be used.

Aromatic carboxylic acid salts suitable for use as the organic component of the electrolyte are those materials having two or more carboxy groups present on each ring of the acid. Illustrative members include, for example, phthalic acid, isophthalic acid and pyromellitic acid.

The following example will serve to further illustrate the present invention but is not meant to limit it thereto.

EXAMPLE

Steel jacketed "D" size primary cells were fabricated in accordance with the cell embodiment described and set forth in U.S. 2,845,471. These cells utilized AZ21X1 magnesium alloy anodes having a nominal composition of about 1.8% Al, 1.3% Zn, 0.15% Ca, balance Mg. The anodes were about 1.5 inches high by about from 0.022 to about 0.025 inch thick and weighed from about 3.8 to about 4.1 grams. A batch of cathode mix was formulated by dry blending about 850 grams of African MnO$_2$, 30 grams BaCrO$_4$ and 120 grams Shawinigan acetylene black. The dry blend was wetted with about 530 milliliters of a predetermined electrolyte per 1000 grams of dry mix. An amount of the resulting wet cathode mix ranging from about 48 to about 52 grams was used in each cell. Cells were discharged continuously at a temperature of about 70° F. through 180 ohms resistance to a 1.20 volt end voltage. This light drain simulates that utilized in current transistor radio circuits for example. Table I summarizes the results of a number of tests made with admixtures of magnesium acetate-magnesium perchlorate electrolyte of various acetate/perchlorate ratios and total electrolyte carboxylate plus perchlorate ion normalities. For control purposes, cells similarly constructed but employing either magnesium acetate or magnesium perchlorate electrolyte alone were subjected to the same test.

The results of these tests clearly show a greater than additive effect on anode efficiency and capacity at low drains using the present novel mixed electrolyte over that which is expected or predicted from admixing the individual components.

*Table I*

| Run No. | Electrolyte Solute Concentration | | Ratio, Acetate (N)/ Perchlorate (N) | Cell Capacity (Hours) | Anode Efficiency (Percent) |
|---|---|---|---|---|---|
| | Magnesium Acetate (N) | Magnesium Perchlorate (N) | | | |
| 1 | 1.0 | 0 (control) | | 510 | 57 |
| 2 | 0.75 | 0.25 | 3 | 520 | 61 |
| 3 | 0.50 | 0.50 | 1 | 630 | 63 |
| 4 | 0.25 | 0.75 | 0.33 | 615 | 62 |
| 5 | 0 | 1.0 (control) | | 490 | 53 |
| 6 | 2.0 | 0 (control) | | <480 | 50 |
| 7 | 1.5 | 0.5 | 3 | 650 | 70 |
| 8 | 1.0 | 1.0 | 1 | 630 | 68 |
| 9 | 0.5 | 1.5 | 0.3 | 580 | 63 |
| 10 | 0 | 2.0 (control) | | 475 | 53 |
| 11 | 3.0 | 0 (control) | | 455 | 52 |
| 12 | 2.5 | 0.5 | 5 | 560 | 61 |
| 13 | 2.0 | 1.0 | 2 | 595 | 64 |
| 14 | 1.5 | 1.5 | 1 | 645 | 65 |
| 15 | 1.0 | 2.0 | 0.67 | 610 | 64 |
| 16 | 0 | 3.0 (control) | | 570 | 60 |
| 17 | 4.0 | 0 (control) | | 465 | 53 |
| 18 | 3.5 | 0.5 | 7 | 600 | 62 |
| 19 | 3.0 | 1.0 | 3 | 635 | 64 |
| 20 | 2.0 | 2.0 | 1 | 605 | 64 |
| 21 | 1.0 | 3.0 | 0.3 | 540 | 64 |
| 22 | 0.5 | 3.5 | 0.14 | 600 | 64 |
| 23 | 0 | 4.0 (control) | | 485 | 59 |

In a manner similar to that described for the foregoing example, the following inorganic perchlorates and organic carboxylic acid salt combinations can be employed as solutes in aqueous admixtures to give greater than additive anode efficiencies for magnesium cells operating at low drains:

(1) 2.0 N sodium perchlorate—3.0 N potassium propionate
(2) 1.0 N lithium perchlorate—3.0 N sodium succinate
(3) 1.0 N potassium perchlorate—1.0 N calcium malonate
(4) 0.25 N cesium perchlorate—0.25 N trisodium citrate
(5) 1.5 N calcium perchlorate—1.5 N sodium maleate
(6) 1.0 N strontium perchlorate—2.0 N calcium acrylate
(7) 2.0 N magnesium perchlorate—0.5 N barium acetate
(8) 0.5 N potassium perchlorate—2.5 N sodium malate
(9) 0.2 N rubidium perchlorate—1.0 dipotassium phthalate
(10) 2.0 N barium perchlorate—1.0 N sodium adipate
(11) 1.5 N sodium perchlorate—1.5 N magnesium glycolate
(12) 2.0 N magnesium perchlorate—2.0 N potassium tartrate
(13) 3.0 N strontium perchlorate—1.0 N tetrasodium pyromellitate
(14) 0.75 N sodium perchlorate—0.75 N sodium pimetate Further, it is to be understood that the various alkali metal or alkaline earth metal carboxylate salts disclosed herein can be used with any of the alkali metal or alkaline earth metal perchlorates also set forth herein to provide the novel electrolyte compositions of the present invention.

Various modifications can be made in the present invention without departing from the spirit or scope thereof for it is understood that I limit myself only as defined in the appended claims.

I claim:
1. In a magnesium battery having a high anode efficiency and potential at low drains which includes a magnesium anode, a cathode, an aqueous electrolyte, a chromate inhibitor and a current collector, the improvement which comprises; providing an aqueous admixture of a carboxylic acid salt-inorganic perchlorate salt wherein the carboxylic acid component of the electrolyte solute is a member selected from the group consisting of alkali metal and alkaline earth salts of aliphatic and aromatic carboxylic acids and further characterized in that the aliphatic acids have a carbon chain length of from 1 to about 5 carbon atoms and there is at least one radical selected from the group consisting of methylene and methyl present for each carboxy group of said aliphatic acid and the aromatic carboxylic acid salts have at least two carboxy groups present on each ring of the aromatic acid, the inorganic perchlorate salt component of said electrolyte being a member selected from the group consisting of alkali and alkaline earth metal perchlorates, the carboxylate anion/perchlorate anion normality ratio of said admixture being from about 0.1 to about 7, the total carboxylate and perchlorate anion concentration ranging from about 0.5 to about 5 normal.

2. The magnesium battery as defined in claim 1 wherein the solute of the aqueous carboxylic acid salt-inorganic perchlorate salt electrolyte is a magnesium acetate-magnesium perchlorate admixture, the ratio of acetate ion/perchlorate ion in said admixture being from 0.1 to about 7 and the concentration of acetate and perchlorate ion in said electrolyte ranging from about 1 to about 4 normal.

3. The magnesium battery as defined in claim 2 having a manganese dioxide cathode and a carbon current collector.

References Cited by the Examiner
UNITED STATES PATENTS

| 2,993,946 | 7/1961 | Lozier | 136—90 |
| 3,057,944 | 10/1962 | Ruetschi et al. | 136—154 X |
| 3,095,331 | 6/1963 | Davis | 136—154 X |

WINSTON A. DOUGLAS, *Primary Examiner.*

B. J. OHLENDORF, *Assistant Examiner.*